(12) United States Patent
Blankenburg et al.

(10) Patent No.: US 9,605,233 B2
(45) Date of Patent: *Mar. 28, 2017

(54) OIL EXTRACTION METHOD AND COMPOSITION FOR USE IN THE METHOD

(71) Applicant: HYDRITE CHEMICAL CO., Brookfield, WI (US)

(72) Inventors: Dean Blankenburg, West Bend, WI (US); Clayton Lepak, West Bend, WI (US); Dave Parkinson, West Bend, WI (US)

(73) Assignee: Hydrite Chemical Co., Brookfield, WI (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/804,796

(22) Filed: Jul. 21, 2015

(65) Prior Publication Data

US 2015/0322377 A1 Nov. 12, 2015

Related U.S. Application Data

(63) Continuation of application No. 13/801,296, filed on Mar. 13, 2013, now Pat. No. 9,090,851.

(51) Int. Cl.
*C11B 13/00* (2006.01)
*B01D 17/04* (2006.01)
(Continued)

(52) U.S. Cl.
CPC .............. *C11B 13/00* (2013.01); *B01D 17/04* (2013.01); *B01D 17/047* (2013.01);
(Continued)

(58) Field of Classification Search
None
See application file for complete search history.

(56) References Cited

U.S. PATENT DOCUMENTS

| 2,367,384 A | 1/1945 | Tymstra et al. |
| 4,029,596 A | 6/1977 | Fink et al. |

(Continued)

FOREIGN PATENT DOCUMENTS

| JP | 55056177 | 4/1980 |
| JP | 07215828 | 8/1995 |
| WO | 2012084448 | 6/2012 |

OTHER PUBLICATIONS

Machine translation of JP,07-215828,A.

(Continued)

*Primary Examiner* — Yate K Cutliff
(74) *Attorney, Agent, or Firm* — Quarles & Brady LLP

(57) ABSTRACT

A composition is disclosed for aiding extraction of an emulsified oil from an oil and water emulsion. The composition includes silicon containing particles at a level of 0.1 wt. % to 30 wt. %; an emulsifying agent at a level of 1 wt. % to 30 wt. %; and water at a level of 40 wt. % to 99 wt. %. A method of extracting oil from an oil and water emulsion in a material is also disclosed. The method includes the steps of (a) dispersing silicon containing particles into the material using a mechanical blending device; and (b) separating the oil from the material. A method of extracting oil from an oil and water emulsion in a material is also disclosed. The method includes the steps of (a) providing a dispersion of silicon containing particles in water; (b) metering the dispersion into the material; and (c) separating the oil from the material.

20 Claims, 4 Drawing Sheets

(51) Int. Cl.
  *B01F 17/54* (2006.01)
  *B03D 3/00* (2006.01)
(52) U.S. Cl.
  CPC .......... *B01F 17/0071* (2013.01); *B03D 3/00* (2013.01); *Y02W 30/74* (2015.05)

(56) References Cited

U.S. PATENT DOCUMENTS

| | | |
|---|---|---|
| 4,702,798 A | 10/1987 | Bonanno |
| 4,844,980 A | 7/1989 | Gruning et al. |
| 5,096,617 A | 3/1992 | Ball et al. |
| 5,283,322 A | 2/1994 | Martin et al. |
| 5,328,692 A | 7/1994 | Dana |
| 5,431,852 A | 7/1995 | Kaijou |
| 5,558,781 A | 9/1996 | Buchold et al. |
| 5,861,451 A | 1/1999 | Schroeder et al. |
| 6,013,157 A | 1/2000 | Li et al. |
| 6,200,940 B1 | 3/2001 | Vitomir |
| 6,201,142 B1 | 3/2001 | Maza |
| 6,548,102 B2 | 4/2003 | Fenske et al. |
| 6,767,124 B2 | 7/2004 | Shikami et al. |
| 7,309,602 B2 | 12/2007 | David |
| 7,601,858 B2 | 10/2009 | Cantrell et al. |
| 8,008,517 B2 | 8/2011 | Cantrell et al. |
| 8,168,037 B2 | 5/2012 | Winsness |
| 8,192,627 B2 | 6/2012 | Gallop et al. |
| 8,841,469 B2 | 9/2014 | Shepperd et al. |
| 8,962,059 B1 | 2/2015 | Froderman et al. |
| 9,090,851 B2 | 7/2015 | Blankenburg et al. |
| 2007/0210007 A1 | 9/2007 | Scheimann et al. |
| 2008/0110577 A1 | 5/2008 | Winsness |
| 2008/0176298 A1 | 7/2008 | Randhava et al. |
| 2010/0256244 A1 | 10/2010 | Rey et al. |
| 2011/0319557 A1 | 12/2011 | Kojima et al. |
| 2012/0125859 A1 | 5/2012 | Collins et al. |
| 2012/0245370 A1 | 9/2012 | Sheppard et al. |
| 2012/0255887 A1 | 10/2012 | Holms et al. |
| 2013/0292339 A1 | 11/2013 | Hartmann et al. |
| 2014/0155639 A1 | 6/2014 | Sticklen et al. |

OTHER PUBLICATIONS

Portet, F., et al., Nonideality of Mixtures of Pure Nonionic Surfactants Both in Solution and at Silica/Water Interfaces, 1996, Journal of Colloid and Interface Science, vol. 184, pp. 216-226.
JP 55056177, Takayama, S. et al., Surface Coating Anti Fogging Agent, 1980. English abstract, 2 pages.
JP 07215828, Arai, K. et al., Detergent composition, 1995, English abstract, 3 pages.
Alther, Put the Breaks on, Removal of Fats, Oil and Greases is Necessary to Recyle Water and Meet Discharge Limits, Chemical Engineering, Mar. 1998, 105(3):82-88.
Babayan, Medium Chain Triglycerides and Structured Lipids, Lipids, 1987, 22(6):417-420.
Frison-Norrie, et al., Investigating the Molecular Heterogeneity of Polysorbate Emulsifiers by MALDI-TOF MS, J. Agric. Food Chem., 2001, 49:3335-3340.
ICI Americas Inc., The HLB System—A Time-Saving Guide to Emulsifier Selection, Copyright 1976 ICI Americas Inc., Revised Mar. 1980, pp. 1-22.
IUPAC-IUB Commission on Biochemical Nomenclature, The Nomenclature of Lipids (Recommendations 1976), Biochem. J., 1978, 171:21-35.
McCutcheon's, vol. 1: Emulsifiers & Detergents, North American Edition, Copyright 1997 McCutcheon's Division, The Manufacturing Confectioner Publishing Co. (Title Page, Table of Contents, p. 211).
Mukerjee, et al., Critical Micelle Concentrations of Aqueous Surfactant Systems, Nat. Stand. Ref. Data Ser., Nat. Bur. Stand. (U.S.), 1971, pp. 1-6.
Mukesh, et al., Lipase Catalysed Esterification of Isosorbide and Sorbitol, Biotechnology Letters, 1993, 15 (12)1243-1246.
Food and Drugs, 21 C.F.R. Sec. 172.840, Polysorbate 80, 2015, 3 pages.
Food and Drugs, 21 C.F.R. Sec. 573.860, Polysorbate 80, 2015, 1 page.

OIL EXTRACTION METHOD AND COMPOSITION FOR USE IN THE METHOD

CROSS-REFERENCES TO RELATED APPLICATIONS

This application is a continuation of U.S. patent application Ser. No. 13/801,296 filed Mar. 13, 2013.

STATEMENT REGARDING FEDERALLY SPONSORED RESEARCH

Not Applicable.

BACKGROUND OF THE INVENTION

1. Field of the Invention

The invention relates to compositions and methods for aiding the extraction of an emulsified oil from an oil and water emulsion.

2. Description of the Related Art

Most commercial corn oil is produced by front end fractionation of corn germ during the wet mill corn process. Recently, a new source of corn oil has arisen as a by-product of the dry-mill process used in the ethanol industry. Dry milling is a process requiring less energy and less capital investment than wet-milling. Though corn oil captured at the tail-end of a dry mill process is not suitable for food use, it can be used as a biodiesel feedstock.

In the dry-mill ethanol process, yellow dent corn is milled, liquefied and sent to a fermenter. Enzymes and yeast are added to convert starch into ethanol, which is subsequently distilled off. This leaves a slurry called whole stillage. Whole stillage, which contains a concentrated oil fraction, is then separated via centrifugation into liquid and solid fractions called thin stillage and wet cake respectively. While part of the thin stillage is recycled to help liquefy the milled corn, the rest is concentrated via evaporation into thick stillage (or syrup), which is dried and mixed with the wet cake to form distillers' dried gains with solubles (DDGS). This is sold as cattle feed and is a good source of protein.

Due to the concentrating effect dry-milling has on the oil fraction, corn oil extracted from thick stillage has become a profitable co-product for the ethanol industry. Although removing corn oil lowers the energy density of DDGS, some studies suggest that high oil content in DDGS interferes with milk production in dairy cattle, and leads to undesirable pork bellies in swine. Therefore, removing some of the oil not only leads to a valuable co-product, but also may improve DDGS quality.

Current methods of extracting corn oil from thick stillage include solvent extraction (often hexane) and decantation. Hexane extraction, though effective, is energy intensive and requires a large amount of capital investment. Decantation requires little capital investment and has the potential of being just as effective as hexane extraction.

Decantation, using centrifuges takes advantage of the density difference between the oil and the aqueous phase to create buoyant force on the oil suspended in solution. In order for the buoyant force to be strong enough to overcome the interfacial interactions and surface friction acting on the oil, individual oil droplets must be large enough so that sufficient force can be generated. The current horizontal decanters used in industry can separate particles as small as twenty micrometers in diameter. The success of current corn oil decantation is highly dependent on upstream processing conditions. Plants using high temperature, high or low pH, smaller grind, and long periods of retention tend to have increased oil yields.

However, there still exists a need for improved methods for recovering corn oil from byproducts of the dry-mill process used in the ethanol industry.

SUMMARY OF THE INVENTION

The present invention addresses the foregoing needs by providing a composition for aiding extraction of an emulsified oil from an oil and water emulsion. The composition includes silicon containing particles at a level of 0.1 wt. % to 30 wt. %, an emulsifying agent at a level of 1 wt. % to 30 wt. %, and water at a level of 40 wt. % to 99 wt. %.

The invention also provides a method of extracting oil from an oil and water emulsion in a material. The method includes the steps of (a) dispersing silicon containing particles into the material using a mechanical blending device; and (b) separating the oil from the material.

The invention also provides a method of extracting oil from an oil and water emulsion in a material. The method includes the steps of (a) providing a dispersion of silicon containing particles in water; (b) metering the dispersion into the material; and (c) separating the oil from the material.

The invention also provides a method of extracting oil from an oil and water emulsion in a material. The method includes the steps of (a) providing an emulsified and/or suspended dispersion of silicon containing particles in water; (b) metering the dispersion into the material; and (c) separating the oil from the material.

These and other features, aspects, and advantages of the present invention will become better understood upon consideration of the following detailed description, drawings, and appended claims.

BRIEF DESCRIPTION OF THE DRAWINGS

Like reference numerals will be used to refer to like parts from Figure to Figure in the following description of the drawings.

DETAILED DESCRIPTION OF THE INVENTION

Figure 1:
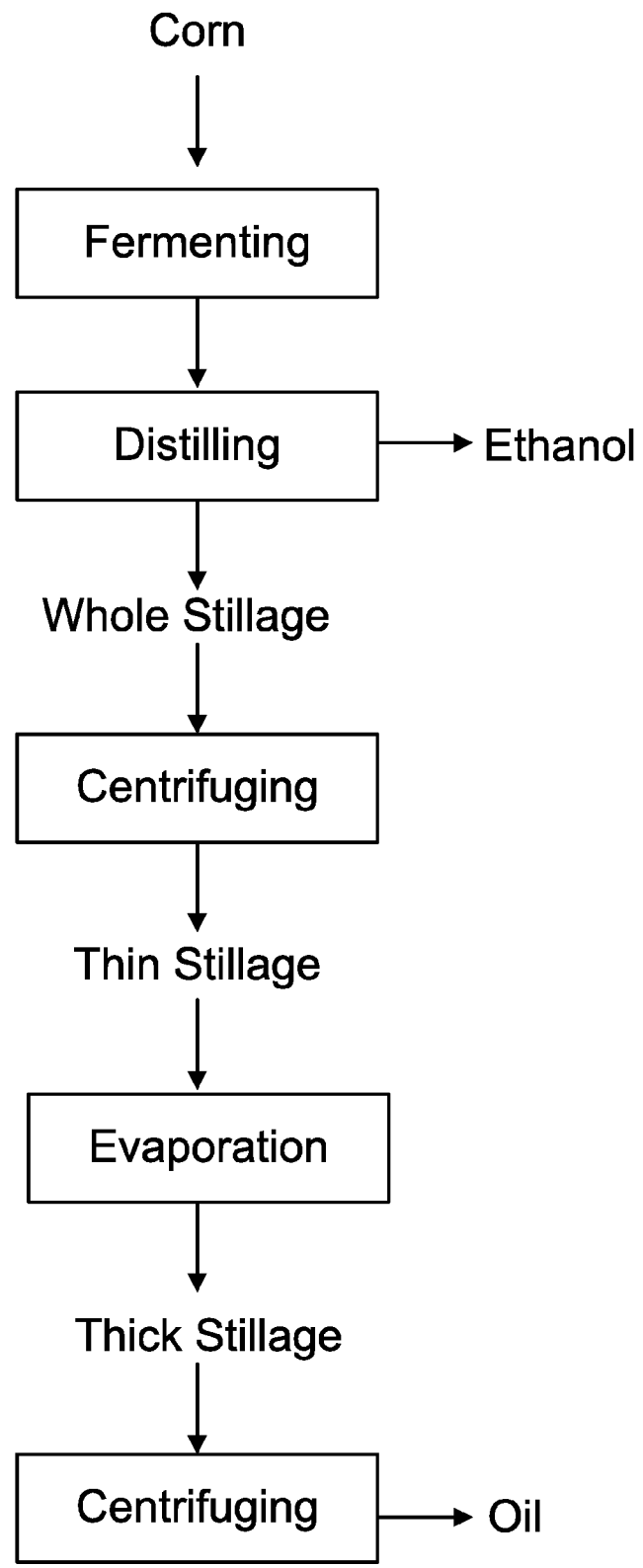
FIG. 1 is a process flow diagram showing a dry-mill ethanol process.

To provide context for the invention, FIG. 1 shows an example a dry-mill ethanol process. Corn is fermented, and ethanol is distilled off. This leaves whole stillage which is separated via centrifuging into a solid fraction and a liquid fraction called thin stillage. The thin stillage is concentrated via evaporation into thick stillage, which can be processed in a centrifugal decanter to separate out the corn oil.

In thick stillage, oil is likely present in four forms: (1) oil-in-water emulsion stabilized by proteins and phospholipids; (2) minute oil droplets that are bound in a matrix of intact and denatured hydrophobic proteins and cell wall components; (3) oil in intact oil bodies released from broken cells; and (4) oil in intact oil bodies in the unbroken endosperm and germ particles. The upstream processing conditions (temperature, pH, etc. . . . ) in the ethanol plant will determine the distribution of oil among these four forms, thus altering the ability of the decanter (e.g., a centrifugal decanter) to separate out the oil.

Oil bodies are the biological structures in which oil, in the form of triglycerides, is contained within the cells of certain seeds. Their purpose is to prevent oil coalescence even in the event of extreme desiccation, an essential step in seed maturation. Though oil bodies are often packed very tightly, they are prevented from coalescing by a highly specialized surface active protein called oleosin. Oleosin is strongly anchored on the surface of the oil body by a long hydrophobic portion. This portion is folded into a hairpin like structure and extends into the oil. On either side are amphiphilic portions which extend over the surface of the oil body, and act to shield the oil body from coalescence via steric and electrostatic hindrance. The estimated size of oil bodies in corn germ is 0.3-1.5 micrometers, significantly smaller than the minimum size requirement for horizontal decanters. Thus, significant coalescence must occur before successful decantation.

Coalescence of two oil droplets in the thick stillage can be broken into two steps. First, the surface of two oil droplets must come into contact with each other. For this to happen, the oil droplets have to be mobile and at least part of the surface must be free of debris that would sterically hinder their progression towards one another. The second step requires that droplets actually coalesce once they come into contact with each other. This depends on the stability of the droplet resulting from biological surfactants (i.e., oleosins and phospholipids). If the droplet is completely covered by intact oleosins, the likelihood of coalescence is minimal.

The present invention breaks the oil-in-water emulsion that is stabilized by proteins and phospholipids such that significant corn oil coalescence can occur before decantation. The oil-in-water emulsion can be present in whole stillage, and/or thin stillage, and/or thick stillage in the dry-mill ethanol process.

Figure 2:
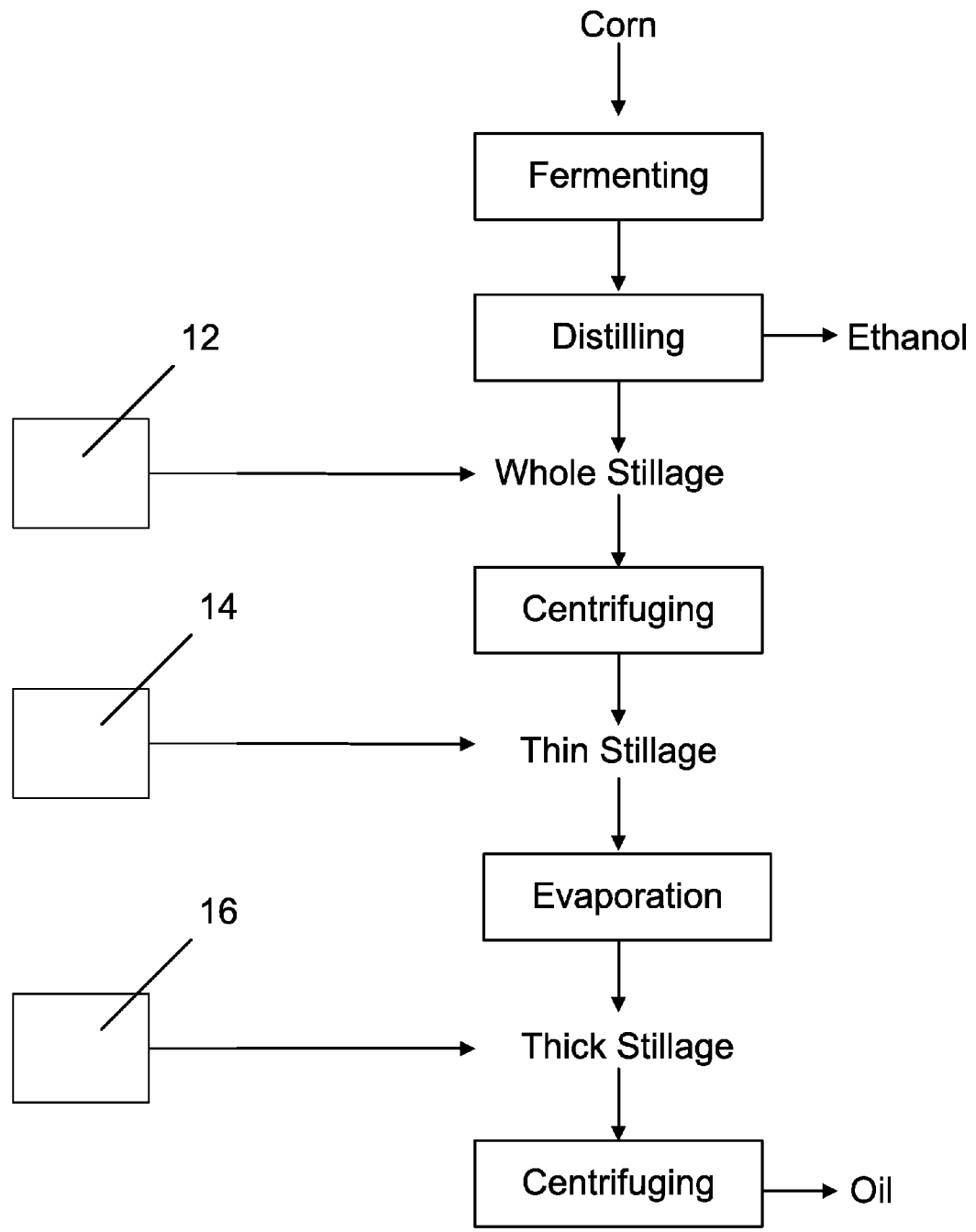
FIG. 2 is a process flow diagram showing one version of a method of oil extraction according to the invention.

Referring now to FIG. 2, there is shown a process flow diagram showing one version of a method of oil extraction according to the invention. In the method of FIG. 2, silicon containing particles from sources 12, 14, 16 are added to the whole stillage, and/or the thin stillage, and/or the thick stillage, and dispersed by mechanical blending. A mechanical blending device can be used for the dispersion. The mechanical blending device can be selected from a dry blending hopper or a tri-blender. Physical addition of the silicon containing particles is also suitable. Any combination of the sources 12, 14, 16 can be used in the method of FIG. 2. The addition of the silicon containing particles leads to significant corn oil coalescence before separation of the corn oil by centrifuging or decantation. This increases the amount of corn oil recovered during separation which can be accomplished using various means such as centrifuging and/or decantation.

In the method of FIG. 2, non-limiting examples of the silicon containing particles include silica, talc, clay, quartz, diatomaceous earth, and mixtures thereof. The silicon containing particles can be precipitated or fumed. The silicon containing particles can be hydrophilic or hydrophobic. Preferably, the silicon containing particles are precipitated hydrophilic silica particles. The silicon containing particles can have an average particle size of less than 100 micrometers, more preferably an average particle size of less than 50 micrometers, and most preferably an average particle size of less than 20 micrometers. Silica nanoparticles may be beneficial. One role of the silicon containing particles is to disrupt the emulsion produced by the biological surfactants allowing the oil to coalesce. The addition of silicon containing particles improves the oil extraction yield dramatically over centrifuging alone. In one version of the invention, the sources 12, 14, 16 only include silica particles.

While corn oil extraction is shown in FIG. 2, the method is suitable for the extraction of other oils that are emulsified. For example, the oil can be a vegetable oil, an animal fat, petroleum oil, and mixtures thereof. The vegetable oil and the animal fat may be emulsified by a biological surfactant comprising phospholipids and proteins.

Figure 3:
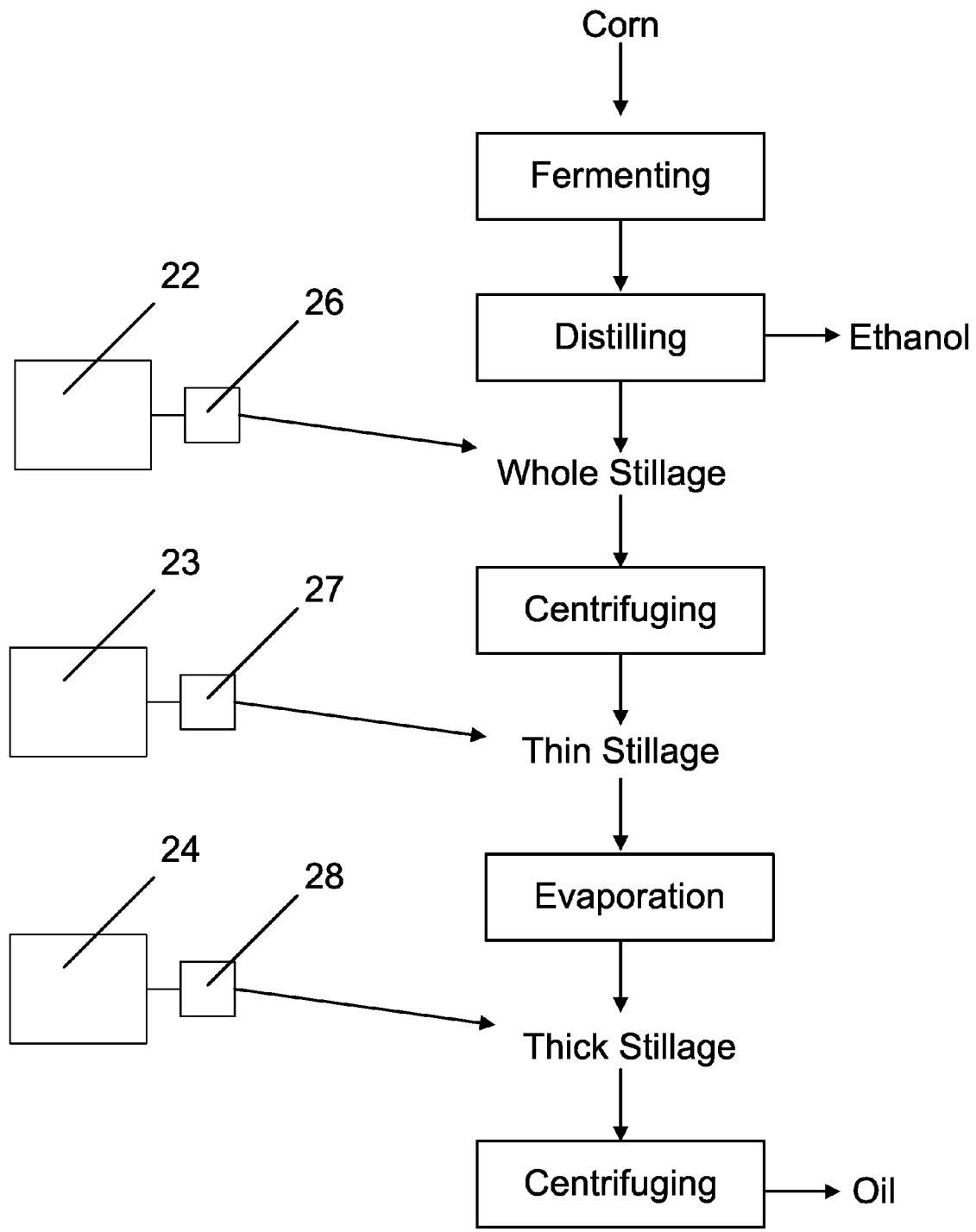
FIG. 3 is a process flow diagram showing another version of a method of oil extraction according to the invention.

Referring now to FIG. 3, there is shown a process flow diagram showing another version of a method of oil extraction according to the invention. In the method of FIG. 3, various compositions of the invention are added to the whole stillage, and/or the thin stillage, and/or the thick stillage such that significant corn oil coalescence can occur before separation of the corn oil by centrifuging or decantation. This increases the amount of corn oil recovered during centrifuging and/or decantation.

In the method of FIG. 3, dispersions of silicon containing particles in water are contained in vessels 22, 23, 24. Metering devices, which in one non-limiting example can be pumps 26, 27, 28, meter the dispersions of silicon containing particles into the whole stillage, and/or the thin stillage, and/or the thick stillage. Any combination of the vessels 22, 23, 24 can be used in the method of FIG. 3. The addition of the silicon containing particles leads to significant corn oil coalescence before separation of the corn oil by centrifuging or decantation. This increases the amount of corn oil recovered during separation which can be accomplished using various means such as centrifuging and/or decantation.

In the method of FIG. 3, the silicon containing particles in the dispersions are preferably selected from silica, talc, clay, diatomaceous earth, and mixtures thereof. The silicon containing particles can be precipitated or fumed. The silicon containing particles can be hydrophilic or hydrophobic. Preferably, the silicon containing particles are precipitated hydrophilic silica particles. The silicon containing particles can have an average particle size of less than 100 micrometers, more preferably an average particle size of less than 50 micrometers, and most preferably an average particle size of less than 20 micrometers. Silica nanoparticles may be beneficial.

The silicon containing particles can be present in any of the dispersions at a level of 0.1 wt. % to 30 wt. %, more preferably, a level of 5 wt. % to 15 wt. %, and most preferably, at a level of up to 15 wt. %. The upper level of silicon containing particles in the dispersion can be limited by viscosity. Water can be the remainder of the dispersions. Optionally, the dispersions can include less than 1% of a biocide/preservative to prevent the growth of micro-organisms and thereby improve the shelf-life of the dispersions. The silicon containing particles can be dispersed under high shear and transferred into the vessels 22, 23, 24. The silicon containing particles can be dispersed using milling, homogenizing, or ultrasonic means.

While corn oil extraction is shown in FIG. 3, the method is suitable for the extraction of other oils that are emulsified. For example, the oil can be a vegetable oil, an animal fat, petroleum oil, and mixtures thereof. The vegetable oil and the animal fat may be emulsified by a biological surfactant comprising phospholipids and proteins.

Figure 4:
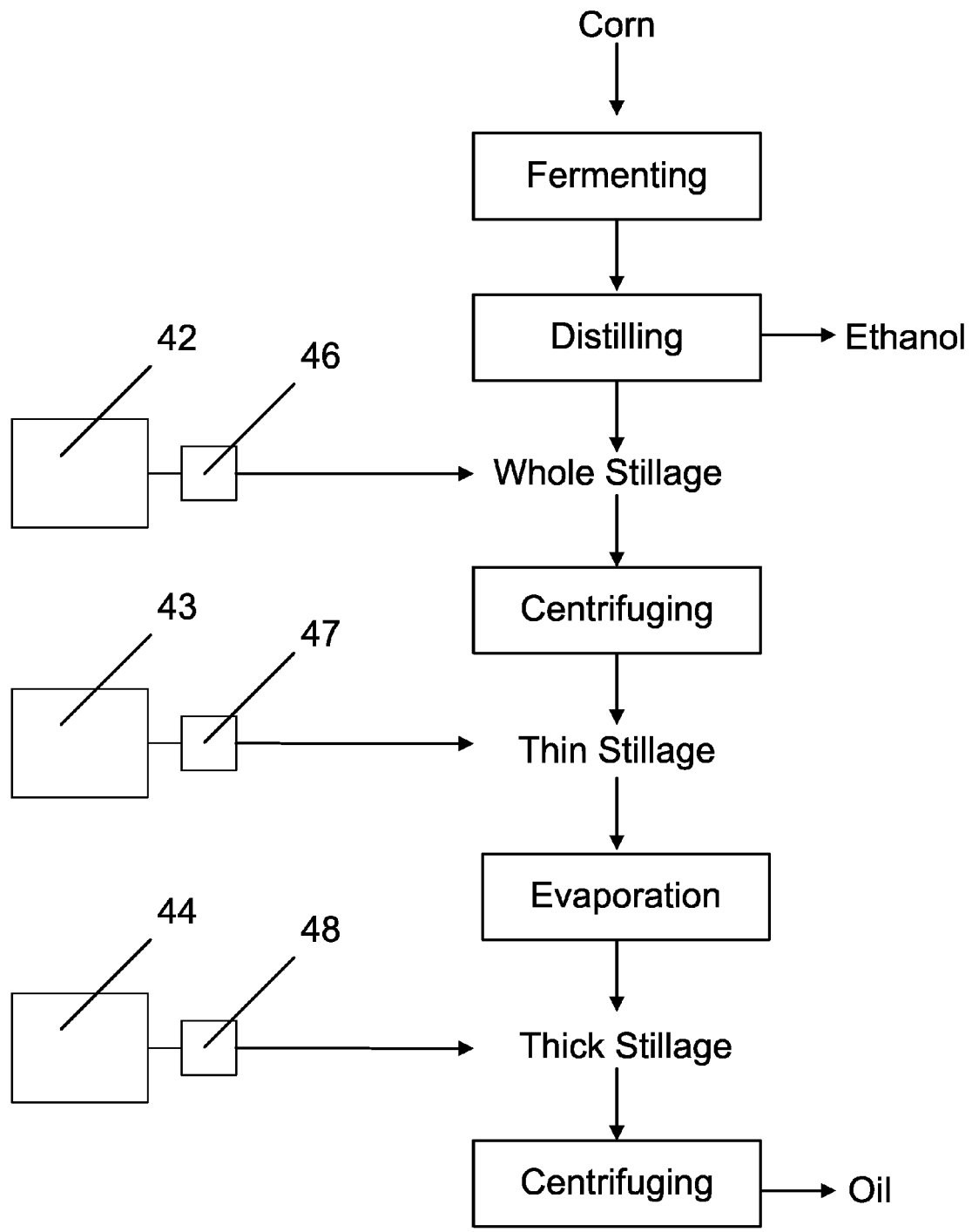
FIG. 4 is a process flow diagram showing yet another version of a method of oil extraction according to the invention.

Referring now to FIG. 4, there is shown a process flow diagram showing yet another version of a method of oil extraction according to the invention. In the method of FIG.

4, a composition of the invention is added to the whole stillage, and/or the thin stillage, and/or the thick stillage such that significant corn oil coalescence can occur before separation of the corn oil by centrifuging or decantation. This increases the amount of corn oil recovered during centrifuging and/or decantation.

In the method of FIG. 4, dispersions of silicon containing particles in water are contained in vessels 42, 43, 44. A suspending agent and/or an emulsifying agent is also contained in vessels 42, 43, 44. Metering devices, which in one non-limiting example can be pumps 46, 47, 48, meter dispersions of silicon containing particles and the suspending agent and/or the emulsifying agent into the whole stillage, and/or the thin stillage, and/or the thick stillage. Any combination of the vessels 42, 43, 44 can be used in the method of FIG. 4. The addition of the silicon containing particles and the suspending agent and/or the emulsifying agent leads to significant corn oil coalescence before separation of the corn oil by centrifuging or decantation. This increases the amount of corn oil recovered during separation which can be accomplished using various means such as centrifuging and/or decantation.

In the method of FIG. 4, the silicon containing particles in the dispersions are preferably selected from silica, talc, clay, diatomaceous earth, and mixtures thereof. The silicon containing particles can be precipitated or fumed. The silicon containing particles can be hydrophilic or hydrophobic. Preferably, the silicon containing particles are precipitated hydrophilic silica particles. The silicon containing particles can have an average particle size of less than 100 micrometers, more preferably an average particle size of less than 50 micrometers, and most preferably an average particle size of less than 20 micrometers.

The silicon containing particles can be present in any of the dispersions at a level of 0.1 wt. % to 30 wt. %, more preferably, a level of 5 wt. % to 15 wt. %, and most preferably, at a level of up to 15 wt. %. The silicon containing particles can be dispersed under high shear in the vessels 42, 43, 44. The silicon containing particles can be dispersed using milling, homogenizing, or ultrasonic means.

In one non-limiting example, the suspending agent is selected from gums or celluloses. Compounds such as gums or celluloses thicken the mixture in the vessels 42, 43, 44 to prevent the silicon containing particles from settling out.

In one non-limiting example, the emulsifying agent is selected from surfactants. Example surfactants include non-ionic surfactants such as: (1) fatty alcohol alkoxylates, especially the ethoxylates, wherein the alkyl group has from 8 to 22 carbons and 5 to 35 moles of alkoxide per molecule; (2) fatty acid alkoxylates having from about 5 to about 35 moles of alkoxylate, especially the ethoxylate; and (3) PEG-ylated sorbitans esterified with fatty acids, commonly known as polysorbates. Non-limiting example polysorbates include polysorbate 20 (polyoxyethylene (20) sorbitan monolaurate), polysorbate 40 (polyoxyethylene (20) sorbitan monopalmitate), polysorbate 60 (polyoxyethylene (20) sorbitan monostearate), and polysorbate 80 (polyoxyethylene (20) sorbitan monooleate) wherein the number following the polyoxyethylene part refers to the total number of oxyethylene —($CH_2CH_2O$)— groups found in the molecule. Most preferably, polysorbate 80 is used in the method of FIG. 4. Non-ionic surfactants having carbon chain lengths of 16-18 carbons are quite advantageous.

The suspending agent and/or the emulsifying agent can be present in the dispersion in water at a level of 1 wt. % to 30 wt. %, more preferably a level of 4 wt. % to 15 wt. %, and most preferably, at a level of up to 15 wt. %.

In one embodiment of the method of FIG. 4, pumps 46, 47, 48 are controlled such that the mixture of the silicon containing particles and the suspending agent and/or the emulsifying agent added to the whole stillage and/or the thin stillage and/or the thick stillage create a composition including silicon containing particles at a level of 0.1 wt. % to 30 wt. %, an emulsifying agent at a level of 1 wt. % to 30 wt. %, and water at a level of 40 wt. % to 99 wt. %. The water-based composition has significantly lower viscosity than other compositions, particularly at temperatures between 32° F. and 50° F.

In one embodiment of the composition used in the method of FIG. 4, the silicon containing particles are present a level of 1 wt. % to 20 wt. %, the emulsifying agent is present at a level of 1 wt. % to 20 wt. %, and water is present at a level of 60 wt. % to 90 wt. %. In another embodiment of the composition, the silicon containing particles are present at greater than 5 wt. % to 15 wt. %, the emulsifying agent is present at a level of 4 wt. % to 15 wt. %, and water is present at a level of 70 wt. % to 90 wt. %. In yet another embodiment of the composition, the dispersion consists essentially of silicon containing particles at a level of greater than 5 wt. % to 15 wt. %, an emulsifying agent at a level of 4 wt. % to 15 wt. %, and water at a level of 70 wt. % to 90 wt. % thereby avoiding components that adversely affect the amount of corn oil recovered during centrifuging and/or decantation.

While corn oil extraction is shown in FIG. 4, the method is suitable for the extraction of other oils that are emulsified. For example, the oil can be a vegetable oil, an animal fat, petroleum oil, and mixtures thereof. The vegetable oil may be emulsified by a biological surfactant comprising phospholipids and proteins.

EXAMPLES

The following Examples have been presented in order to further illustrate the invention and are not intended to limit the invention in any way.

Example 1

Surfactants have the ability to competitively absorb at an air water, or oil water interface, displacing absorbed proteins via an orogenic mechanism. The orogenic mechanism occurs in a number of steps. In the case of protein stabilized air, a non-ionic surfactant that is more stable than the absorbed protein will add at a weak point in the protein stabilizing matrix. Surfactant will continue to add to the weak point. As surface pressure builds on the interface, the protein will start to condense giving way to the more stable surfactant. At some critical surface pressure, the protein matrix will collapse releasing the air bubble.

Differences in the number addition sites and the relative surface pressure leading to matrix collapse were observed for ionic and non-ionic surfactants. For ionic surfactants, more nucleation sites at the air water interface were present compared to non-ionic surfactant. This can be attributed to electrostatic repulsion between individual surfactant molecules. As the initial point of nucleation grows, so does the repulsive charge at that site, thus making additional sites of nucleation more energetically favorable. The difference in surface pressure could be attributed to the method of nucleation (more sites vs. less sites) or increased surfactant-protein interaction due to charged surfactant head groups.

Competitive displacement of oil body proteins with surfactants was studied. Differences in non-ionic surfactants were observed using polysorbate 20 (polyoxyethylene (20)

sorbitan monolaurate) and polysorbate 60 (polyoxyethylene (20) sorbitan monostearate) wherein the number following the polyoxyethylene part refers to the total number of oxyethylene —(CH$_2$CH$_2$O)— groups found in the molecule. While both surfactants broke the protein matrix at the same surface pressure, more polysorbate 60 was needed to get to that pressure. This can be attributed to tighter packing due to polysorbate 60 having a longer hydrophobic chain. This could affect polysorbate 60 efficiency in a number of ways: polysorbate 60 may have a harder time adding to nucleated sites due reduced monolayer fluidity, more polysorbate 60 may have to be absorbed at the interface to displace the same amount space, or polysorbate 60 may diffuse through solution at a slower rate than polysorbate 20.

Competitive displacement of oil body protein by polysorbate 80 (polyoxyethylene (20) sorbitan monooleate) was also studied. It was shown that at low levels of polysorbate 80, less stable surface active proteins called caleosins and steroleosin were displaced. At higher levels of polysorbate 80, oleosin was displaced, but not completely. This is due to the stability of oleosin relative to other oil body proteins.

In general, oil body proteins are more stable than other common surface active proteins like those found in milk or egg yolk. This is important in context of oil demulsification, since rigorous process conditions (temperature, pH, mechanical action) could cause a portion of the oil body proteins to become denatured, thus leaving them less surface stable. Think of an active protein as a ball of yarn. Putting ten balls of yarn in a box is not a problem, but stretch the yarn out and it quickly becomes a tangled mess.

If some of the proteins are denatured, these proteins would interact with surrounding proteins more readily, and have been shown to form a viscoelastic mesh, preventing oil coalescence via a surrounding protein barrier. This viscoelastic barrier increases emulsion stability in isolated oil bodies that cream rapidly in the absence of such a barrier. Since denatured proteins no longer have the same surface activity, the addition of a surface active surfactant would selectively kick off the denatured proteins and allow the oil body to shed its protective protein barrier. These newly freed oil bodies, covered by surfactant and intact oil body proteins, would have the ability to collide with one another facilitating the first step of coalescence.

Polysorbate 80 currently out-performs all other surfactants tested including polysorbate 20, polysorbate 40 (polyoxyethylene (20) sorbitan monopalmitate), and polysorbate 60. According to polysorbate 80's role in the competitive absorption mechanism, that this dominance can be explained by polysorbate 80's unique optimization of three contributing factors: interface affinity, packing, and surfactant diffusivity.

Interface affinity indicates the affinity of the surfactant to the oil water interface. If the surfactant has a higher affinity to the interface than the protein, the surfactant will competitively displace the protein. This factor not only has to do with the relative ratio of hydrophobic to hydrophilic portions (HLB number), but also the size of the molecule. A larger molecule, with the exact same HLB number as a smaller molecule, will be have a greater affinity to the interface. Interestingly, phospholipids, the molecules making up the lipid bilayer of all cellular organisms, contain two fatty acid chains with lengths ranging between 14 and 24 carbons long. The composition of corn oil is generally 55% linoleic acid (18:2), 23% oleic acid (18:1), and 12% palmitic (16:0). Since the phospholipid bilayer is often representative of the fatty acids available in the cell, it can be concluded that the phospholipids present are mostly between 16 and 18 carbons long. This could indicate that the surfactant with the maximum chain interactions leading to the highest interfacial affinity would have chain lengths between 16 and 18 carbons long.

Packing refers to how densely absorbed a surfactant is on an interface. Packing in a bi-lipid membrane, such as the phospholipid membranes found in cells, is contingent upon packing conditions of the surfactant head and tail groups. The larger hydrophobic head group on polysorbate 80 could explain its dominance over other surfactants. Not only would this large head take up more area, it also makes the lipid packing ratio <1. This indicates that the molecules hydrophilic head takes up more space than the hydrophobic tail, and therefore causes the most stable geometry of the surface to increase in curvature. In addition, the unsaturated fatty acid hydrophobic tail on polysorbate 80, will pack less tightly than saturated fatty acid chains (polysorbate 20, polysorbate 40, and polysorbate 60) and would lead to a membrane that is more fluidic. A fluidic membrane could facilitate surfactant diffusion onto the membrane, thus altering the kinetics of the competitive displacement mechanism in favor of the surfactant.

Example 2

Upon collision, the oil globules will either come together (coalesce) or move apart. The probability of coalescence depends on the presence of surfactant (oil body proteins, phospholipids, polysorbate 80) at the oil water interface. If the oil is covered in intact oleosins, the probability of coalescence will be small. If some of these proteins are removed or denatured, the probability of coalescence will increase.

Hydrophobic precipitated silica particles are porous particles treated with siloxane polymer chains. These chains are of variable length and cause the silica to be hydrophobic. Protein buildup on siloxane treated hydrophobic surfaces is well documented. This is thought to be a result of hydrophobic interactions, and leads to protein adhesion and subsequent denaturation on the silica surface.

Without intending to be bound by theory, there are a few different ways in which the silica could be acting. The first is as a fining agent that removes protein from the aqueous phase. This could explain the observation that the oil obtained using the polysorbate 80+silica vs. straight polysorbate 80 appeared less cloudy. Silica may actively strip protein from oil globules which brush by, or act as a protein-sink in the polysorbate 80 facilitated protein desorption and transportation away from the oil-water interface.

Silica could also promote coalescence by providing a surface around which oil bodies collect and eventually coalesce. Due to its highly hydrophobic surface, oil has been shown to preferentially wet a hydrophobic silica particle's surface. Therefore with a silica particle present, two oil globules which would normally move apart after collision would now be stuck together. This would increase their time in close proximity and thus increase the probability of coalescence.

Example 3

Corn oil demulsification tests were performed. The demulsification properties of a dispersion containing 80 wt. % water, 10 wt. % hydrophilic precipitated silica particles, and 10 wt. % polysorbate 80 (Dispersion 1) was compared to 100% polysorbate. Dispersion 1 had superior demulsification properties.

The demulsification properties of a dispersion containing 70 wt. % water, 10% hydrophilic precipitated silica particles, and 20% polysorbate 80 (Dispersion 2) was compared to 100% polysorbate. Dispersion 2 had better demulsification properties.

Thus, the invention provides compositions and methods for aiding the extraction of an emulsified oil from an oil and water emulsion. In one version of the invention used in a dry-mill ethanol process, significant corn oil coalescence can occur before separation of the corn oil by centrifuging or decantation. This increases the amount of corn oil recovered during centrifuging and/or decantation.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A composition for aiding extraction of an emulsified oil from an oil and water emulsion, the composition comprising:
   silicon containing particles at a level of greater than 5 wt. %;
   a polysorbate; and
   water,
   wherein the silicon containing particles are dispersed in the water.

2. The composition of claim 1 wherein:
the silicon containing particles are present at greater than 5 wt. % to 30 wt. %.

3. The composition of claim 1 wherein:
the silicon containing particles are selected from the group consisting of silica, talc, clay, quartz, diatomaceous earth, and mixtures thereof.

4. The composition of claim 3 wherein:
the silicon containing particles are hydrophobic.

5. The composition of claim 1 wherein:
the silicon containing particles have an average particle size of less than 100 micrometers.

6. The composition of claim 1 wherein:
the silicon containing particles have an average particle size of less than 50 micrometers.

7. The composition of claim 1 wherein:
the silicon containing particles have an average particle size of less than 20 micrometers.

8. A method of extracting oil from an oil and water emulsion in a material, the method comprising:
   (a) creating a dispersion of hydrophobic silicon containing particles and a polysorbate in the material using a mechanical blending device; and
   (b) separating the oil from the material,
   wherein the silicon containing particles are present in the dispersion at greater than 5 wt. %.

9. The method of claim 8 wherein:
the silicon containing particles are selected from the group consisting of silica, talc, clay, quartz, diatomaceous earth, and mixtures thereof.

10. The method of claim 8 wherein:
the silicon containing particles have an average particle size of less than 100 micrometers.

11. The method of claim 8 wherein:
the silicon containing particles have an average particle size of less than 50 micrometers.

12. The method of claim 8 wherein:
the silicon containing particles have an average particle size of less than 20 micrometers.

13. The method of claim 8 wherein:
the mechanical blending device is selected from a dry blending hopper, a tri-blender, and physical addition.

14. The method of claim 8 wherein:
the oil is selected from the group consisting of vegetable oils, animal fats, and petroleum oil.

15. The method of claim 8 wherein:
the oil and water emulsion comprises a vegetable oil and/or an animal fat emulsified by a biological surfactant comprising phospholipids and proteins.

16. The method of claim 8 wherein:
the oil is corn oil, and
step comprises (b) centrifuging the material to separate the oil.

17. The method of claim 16 wherein:
the material is whole stillage, thin stillage, or thick stillage.

18. The method of claim 8 wherein:
the dispersion includes a suspending agent, and
the suspending agent is selected from gums or celluloses.

19. The method of claim 8 wherein:
step (a) comprises dispersing the silicon containing particles under high shear.

20. The method of claim 8 wherein:
the dispersion comprises silicon containing particles at a level of greater than 5 wt. % to 30 wt. %.

* * * * *